(12) United States Patent
Fukami et al.

(10) Patent No.: US 11,245,585 B2
(45) Date of Patent: Feb. 8, 2022

(54) NETWORK MANAGEMENT DEVICE, NETWORK MANAGEMENT METHOD, AND NETWORK MANAGEMENT PROGRAM

(71) Applicant: NIPPON TELEGRAPH AND TELEPHONE CORPORATION, Tokyo (JP)

(72) Inventors: Kimihiko Fukami, Musashino (JP); Masataka Sato, Musashino (JP); Kenichi Tayama, Musashino (JP); Shingo Horiuchi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/975,851

(22) PCT Filed: Feb. 21, 2019

(86) PCT No.: PCT/JP2019/006606
§ 371 (c)(1),
(2) Date: Aug. 26, 2020

(87) PCT Pub. No.: WO2019/167801
PCT Pub. Date: Sep. 6, 2019

(65) Prior Publication Data
US 2020/0412606 A1    Dec. 31, 2020

(30) Foreign Application Priority Data

Feb. 28, 2018    (JP) .............................. JP2018-034981

(51) Int. Cl.
*G06F 15/177* (2006.01)
*H04L 12/24* (2006.01)
*H04L 12/26* (2006.01)

(52) U.S. Cl.
CPC ........ *H04L 41/085* (2013.01); *H04L 41/0866* (2013.01); *H04L 43/045* (2013.01)

(58) Field of Classification Search
USPC ................................. 709/220, 223, 221, 222
See application file for complete search history.

(56) References Cited

U.S. PATENT DOCUMENTS

2016/0050116 A1*  2/2016  Sheshadri ............... H04L 67/10
                                                            709/221
2018/0062924 A1*  3/2018  Shanks ............... H04L 41/0893
(Continued)

OTHER PUBLICATIONS

Tsunemasa Hayashi, "Visible-Systematization Technologies of Network information for Simple and Sophisticated OpS." Institute of Electronics, Information and Communication Engineers, vol. 109, No. 273, 2009. Machine translation attached.

(Continued)

*Primary Examiner* — Lan Dai T Truong
(74) *Attorney, Agent, or Firm* — Harness, Dickey & Pierce, P.L.C.

(57) ABSTRACT

A network management device according to an embodiment includes network property storage means for storing information representing network properties, information object storage means for storing an information object relating to a network configuration corresponding to information representing network properties stored in the network property storage means, network property acquisition means for acquiring, from the network property storage means, information representing network properties corresponding to an optional protocol layer, information object acquisition means for acquiring, from the information object storage means, the information object corresponding to information representing network properties acquired by the network property acquisition means, and display means for display- (Continued)

ing the information object acquired by the information object acquisition means.

4 Claims, 24 Drawing Sheets

(56) References Cited

U.S. PATENT DOCUMENTS

2018/0262497 A1* 9/2018 Raje .................... G06F 3/167
2019/0166542 A1* 5/2019 Huang ............... H04W 40/248
2019/0319926 A1* 10/2019 Cummins .......... H04L 63/0263

OTHER PUBLICATIONS

Tatsuya Torita, Masaru Sugawara, Manabu Kinugasa, Emiko Yashima, Noriyuki Nakajima, Tsunemasa Hayashi. "A management system for Optical integrated network." Institute of Electronics, Information and Communication Engineers, vol. 111, No. 93, 2011. Machine translation attached.

* cited by examiner

Fig. 5

| specName | ATTRIBUTE NAME | valueFrom | valueTo | TYPE OF value |
|---|---|---|---|---|
| LINE Spec_OADM | CONNECTION RELATION ~a | - | - | ARRAY HAVING POINT Entity_OADM |
| LINE Spec_OADM | WAVELENGTH NO. ~b | 1 | 100 | CHARACTER STRING (WAVELENGTH) |
| LINE Spec_IP | CONNECTION RELATION ~a | - | - | ARRAY HAVING POINT Entity_IP |
| LINE Spec_IP | Port NO. ~b | 0 | 65535 | int |

Fig. 6

| specName | ATTRIBUTE NAME | valueFrom | valueTo | TYPE OF value |
|---|---|---|---|---|
| POINT Spec_OADM | WAVELENGTH NO. | λ1 | λ10 | string |
| POINT Spec_OADM | x COORDINATE | 0 | 65535 | int |
| POINT Spec_OADM | y COORDINATE | 0 | 65535 | int |
| POINT Spec_OADM | DEPENDENCY RELATION | - | - | POINT Spec_IP |
| POINT Spec_IP | IP ADDRESS | 0.0.0.0 | 255.255.255.0 | ipAddress |
| POINT Spec_IP | x COORDINATE | 0 | 65535 | int |
| POINT Spec_IP | y COORDINATE | 0 | 65535 | int |
| POINT Spec_IP | DEPENDENCY RELATION | - | - | null |

Fig. 7

| specName | ATTRIBUTE NAME | valueFrom | valueTo | TYPE OF value |
|---|---|---|---|---|
| PLANE Spec_OADM | COMMUNICATION RANGE | - | - | ARRAY HAVING POINT Entity_OADM |
| PLANE Spec_OADM | COMMUNICATION STATE ~a | - | - | string (Established/LinkDown) |
| PLANE Spec_OADM | RING NAME ~b | - | - | string (LIGHT WAVELENGTH PATHNAME) |
| PLANE Spec_IP | COMMUNICATION RANGE | - | - | ARRAY HAVING POINT Entity_IP |
| PLANE Spec_IP | COMMUNICATION STATE ~a | - | - | string |

Fig. 8A

| specName | ATTRIBUTE NAME | valueFrom | valueTo | TYPE OF value |
|---|---|---|---|---|
| LINE Spec_OADM | CONNECTION RELATION | - | - | ARRAY HAVING POINT Entity_OADM |
| LINE Spec_OADM | WAVELENGTH NO. | 1 | 100 | CHARACTER STRING (WAVELENGTH) |
| LINE Spec_IP | CONNECTION RELATION | - | - | ARRAY HAVING POINT Entity_IP |
| LINE Spec_IP | Port NO. | 0 | 65535 | Int |

Fig. 8B

| entityName | ATTRIBUTE NAME | value | DEPENDENT Spec |
|---|---|---|---|
| LINE Entity_OADM | CONNECTION RELATION | | LINE Spec_OADM |
| LINE Entity_OADM | WAVELENGTH NO. | | LINE Spec_OADM |
| LINE Entity_IP | CONNECTION RELATION | | LINE Spec_IP |
| LINE Entity_IP | Port NO. | | LINE Spec_IP |

Fig. 9A

| specName | ATTRIBUTE NAME | valueFrom | valueTo | TYPE OF value |
|---|---|---|---|---|
| POINT Spec_OADM | WAVELENGTH NO. | λ1 | λ10 | string |
| POINT Spec_OADM | x COORDINATE | 0 | 65535 | int |
| POINT Spec_OADM | y COORDINATE | 0 | 65535 | int |
| POINT Spec_OADM | DEPENDENCY RELATION | - | - | POINT Spec_IP |
| POINT Spec_IP | IP ADDRESS | 0.0.0.0 | 255.255.255.0 | ipAddress |
| POINT Spec_IP | x COORDINATE | 0 | 65535 | int |
| POINT Spec_IP | y COORDINATE | 0 | 65535 | int |
| POINT Spec_IP | DEPENDENCY RELATION | - | - | null |

Fig. 9B

| entityName | ATTRIBUTE NAME | value | DEPENDENT Spec |
|---|---|---|---|
| POINT Entity_OADM | WAVELENGTH NO. | | POINT Spec_OADM |
| POINT Entity_OADM | x COORDINATE | | POINT Spec_OADM |
| POINT Entity_OADM | y COORDINATE | | POINT Spec_OADM |
| POINT Entity_OADM | DEPENDENCY RELATION | | POINT Spec_OADM |
| POINT Entity_IP | IP ADDRESS | | POINT Spec_IP |
| POINT Entity_IP | x COORDINATE | | POINT Spec_IP |
| POINT Entity_IP | y COORDINATE | | POINT Spec_IP |
| POINT Entity_IP | DEPENDENCY RELATION | | null |

Fig 10A

| specName | ATTRIBUTE NAME | valueFrom | valueTo | TYPE OF value |
|---|---|---|---|---|
| PLANE Spec_OADM | COMMUNICATION RANGE | - | - | ARRAY HAVING POINT Entity_OADM |
| PLANE Spec_OADM | COMMUNICATION STATUS | - | - | string (Established/LinkDown) |
| PLANE Spec_OADM | RING NAME | - | - | string (LIGHT WAVELENGTH PATHNAME) |
| PLANE Spec_IP | COMMUNICATION RANGE | - | - | ARRAY HAVING POINT Entity_IP |
| PLANE Spec_IP | COMMUNICATION STATUS | - | - | string |

Fig. 10B

| entityName | ATTRIBUTE NAME | value | DEPENDENT Spec |
|---|---|---|---|
| PLANE Entity_OADM | COMMUNICATION RANGE | | PLANE Spec_OADM |
| PLANE Entity_OADM | COMMUNICATION STATUS | | PLANE Spec_OADM |
| PLANE Entity_OADM | RING NAME | | PLANE Spec_OADM |
| PLANE Entity_IP | COMMUNICATION RANGE | | PLANE Spec_IP |
| PLANE Entity_IP | COMMUNICATION STATUS | | PLANE Spec_IP |

Fig. 12

| entityName | ATTRIBUTE NAME | value | DEPENDENT Spec |
|---|---|---|---|
| LINE Entity_OADM_1 | CONNECTION RELATION | [1,2] | LINE Spec_OADM |
| LINE Entity_OADM_1 | WAVELENGTH NO. | λ10 | LINE Spec_OADM |
| LINE Entity_OADM_2 | CONNECTION RELATION | [1,3] | LINE Spec_OADM |
| LINE Entity_OADM_2 | WAVELENGTH NO. | λ10 | LINE Spec_OADM |
| LINE Entity_OADM_3 | CONNECTION RELATION | [2,3] | LINE Spec_OADM |
| LINE Entity_OADM_3 | WAVELENGTH NO. | λ10 | LINE Spec_OADM |
| LINE Entity_IP_4 | CONNECTION RELATION | [4,1,2,5] | LINE Spec_IP |
| LINE Entity_IP_4 | Port NO. | 10 | LINE Spec_IP |

Fig. 13A

| entityName | ATTRIBUTE NAME | value | DEPENDENT Spec |
|---|---|---|---|
| POINT Entity_OADM_1 | WAVELENGTH NO. | λ1 | POINT Spec_OADM |
| POINT Entity_OADM_1 | x COORDINATE | 10 | POINT Spec_OADM |
| POINT Entity_OADM_1 | y COORDINATE | 50 | POINT Spec_OADM |
| POINT Spec_OADM_1 | DEPENDENCY RELATION | POINT Entity_IP_1 | POINT Spec_OADM |
| POINT Entity_OADM_2 | WAVELENGTH NO. | λ1 | POINT Spec_OADM |
| POINT Entity_OADM_2 | x COORDINATE | 110 | POINT Spec_OADM |
| POINT Entity_OADM_2 | y COORDINATE | 50 | POINT Spec_OADM |
| POINT Spec_OADM_2 | DEPENDENCY RELATION | POINT Entity_IP_2 | POINT Spec_OADM |
| POINT Entity_OADM_3 | WAVELENGTH NO. | λ1 | POINT Spec_OADM |
| POINT Entity_OADM_3 | x COORDINATE | 50 | POINT Spec_OADM |
| POINT Entity_OADM_3 | y COORDINATE | 45 | POINT Spec_OADM |
| POINT Spec_OADM_3 | DEPENDENCY RELATION | null | POINT Spec_OADM |

Fig. 13B

| POINT Entity_IP_4 | IP ADDRESS | IP_4 | POINT Spec_IP |
| POINT Entity_IP_4 | x COORDINATE | 1 | POINT Spec_IP |
| POINT Entity_IP_4 | y COORDINATE | 80 | POINT Spec_IP |
| POINT Entity_IP_4 | DEPENDENCY RELATION | null | POINT Spec_IP |
| POINT Entity_IP_5 | IP ADDRESS | IP_5 | POINT Spec_IP |
| POINT Entity_IP_5 | x COORDINATE | 130 | POINT Spec_IP |
| POINT Entity_IP_5 | y COORDINATE | 80 | POINT Spec_IP |
| POINT Entity_IP_5 | DEPENDENCY RELATION | null | POINT Spec_IP |

Fig. 14

| entityName | ATTRIBUTE NAME | value | DEPENDENT Spec |
|---|---|---|---|
| POINT Entity_IP_1 | IP ADDRESS | IP_1 | POINT Spec_IP |
| POINT Entity_IP_1 | x COORDINATE | 10 | POINT Spec_IP |
| POINT Entity_IP_1 | y COORDINATE | 80 | POINT Spec_IP |
| POINT Entity_IP_2 | IP ADDRESS | IP_2 | POINT Spec_IP |
| POINT Entity_IP_2 | x COORDINATE | 110 | POINT Spec_IP |
| POINT Entity_IP_2 | y COORDINATE | 80 | POINT Spec_IP |

Fig. 15

| entityName | ATTRIBUTE NAME | value | DEPENDENT Spec |
|---|---|---|---|
| PLANE Entity_OADM | COMMUNICATION RANGE | [POINT 1, POINT 2, POINT 3] | PLANE Spec_OADM |
| PLANE Entity_OADM | COMMUNICATION STATUS | established | PLANE Spec_OADM |
| PLANE Entity_OADM | RING NAME | ring1 | PLANE Spec_OADM |
| PLANE Entity_IP | COMMUNICATION RANGE | [LINE 4] | PLANE Spec_IP |
| PLANE Entity_IP | COMMUNICATION STATUS | established | PLANE Spec_IP |

NETWORK MANAGEMENT DEVICE, NETWORK MANAGEMENT METHOD, AND NETWORK MANAGEMENT PROGRAM

CROSS-REFERENCE TO RELATED APPLICATIONS

This application is a 371 U.S. National Phase of International Application No. PCT/JP2019/006606, filed on Feb. 21, 2019, which claims priority to Japanese Application No. 2018-034981, filed on Feb. 28, 2018. The entire disclosures of the above applications are incorporated herein by reference.

TECHNICAL FIELD

An embodiment of the present invention relates to a network management device, a network management method, and a network management program.

BACKGROUND ART

There is technology, in an operation support system that performs integrated management of a communication network (hereinafter may be referred to as NW) constructed of different protocol layers, such as each of forwarding layer and IP layer for example, for visualization of each of the physical configuration of the network, configuration of each protocol layer, and connections among the protocol layers. Now, information indicating configurations of the protocol layers and connection among the protocol layers (NW configuration information) has been defined in programs (See NPL 1, for example.).

There also is technology where technology the same as that in NPL 1 has been applied to an optical integrated network, but information indicating configurations of the protocol layers and connection among the protocol layers has been defined in programs in this technology as well (See NPL 2, for example.).

CITATION LIST

Non Patent Literature

[NPL 1] Tsunemasa Hayashi, "'Visualization' Technology for Network information, and Simplification and Sophistication of Network Operation Services", The Institute of Electronics, Information and Communication Engineers Technical Report NS2009-110

[NPL 2] Tatsuya Torita and four others, "Examination of Management Model for Optical Integrated Network", The Institute of Electronics, Information and Communication Engineers Technical Report PN2011-06

SUMMARY OF THE INVENTION

Technical Problem

Now, the definition of NW configuration information differs from one network to another, and accordingly in a case where there is a change in the types of protocols of the network that is the object of visualization, the number of devices, and so forth, there has been a need to perform corrections by design change of functional portions to be visualized, and so forth.

For example, an assumption will be made that before changing, the object NW for visualization is only a forwarding NW, the definition of NW configuration information is "network configuration A", and the visualization program is "visualization program A". At this time, in a case where the visualization object NW after changing is a NW where an IPNW is superimposed on the forwarding NW, and the definition of the NW configuration information is changed to "network configuration B", there is a need to correct the visualization program to "visualization program B" in accordance with the change.

The present invention has been made taking note of the above circumstances, and it is an object thereof to provide a network management device, a network management method, and a network management program, where correction relating to communication network visualization is unnecessary.

Means for Solving the Problem

In order to achieve the above object, in a first aspect of a network management device according to an embodiment of the present invention, the network management device includes network property storage means for storing information representing network properties, and information object storage means for storing an information object relating to a network configuration corresponding to information representing network properties stored in the network property storage means. In the first aspect, the network management device includes network property acquisition means for acquiring, from the network property storage means, information representing network properties corresponding to an optional protocol layer. In the first aspect, the network management device includes information object acquisition means for acquiring, from the information object storage means, the information object corresponding to information representing network properties acquired by the network property acquisition means. In the first aspect, the network management device includes display means for displaying the information object acquired by the information object acquisition means.

According to a second aspect of the network management device of the present invention, in the first aspect, the information object is line information representing a flow of communication over a network, point information representing a terminal point of communication traffic, and plane information representing a range of flow of communication.

According to a third aspect of the network management device of the present invention, in the second aspect, the information object is information common to a plurality of types of communication protocols, and information specialized to types of communication protocols. In the third aspect, the display means displays the information common to a plurality of types of communication protocols as a shape configured of the line information, the point information, and the plane information, and displays the information specialized to types of communication protocols as a character string corresponding to the shape.

An aspect of a network management method carried out by a network management device according to an embodiment of the present invention is a network management method carried out by a network management device that has network property storage means for storing information representing network properties and information object storage means for storing an information object relating to a network configuration corresponding to network properties stored in the network property storage means. In this aspect, information representing network properties corresponding to an optional protocol layer is acquired from the network property storage means, the information object corresponding to information representing network properties is acquired from the information object storage means, and the information object that has been acquired is displayed.

An aspect of a network management program according to an embodiment of the present invention causes a processor to function as the respective means of the network management device according to any one of the first to third aspects.

Effects of the Invention

According to the first aspect of the network management device in an embodiment of the present invention, an information object corresponding to network properties of a certain protocol layer can be displayed.

According to the second aspect of the network management device in an embodiment of the present invention, information common to a plurality of types of communication protocols can be displayed as a shape configured of line information, point information, and plane information, and information specialized to types of communication protocols can be displayed as a character string corresponding to the shape.

According to the third aspect of the network management device in an embodiment of the present invention, the information object can be displayed as line information representing a flow of communication over a network, point information representing a terminal point of communication traffic, and plane information representing a range of flow of communication.

That is to say, according to the present invention, correction relating to communication network visualization can be made to be unnecessary.

BRIEF DESCRIPTION OF DRAWINGS

FIG. 5 is a diagram showing a design case of a line Spec table showing line Specs stored in a Spec DB.

FIG. 6 is a diagram showing a design case of a point Spec table showing point Specs stored in the Spec DB.

FIG. 7 is a diagram showing a design case of a plane Spec table showing plane Specs stored in the Spec DB.

FIG. 8A is a diagram showing an example of a design of a line Entity table that manages line Entities corresponding to line Specs, out of line Specs shown in the line Spec table.

FIG. 8B is a diagram showing an example of a design of a line Entity table that manages line Entities corresponding to line Specs, out of line Specs shown in the line Spec table.

FIG. 9A is a diagram showing an example of a design of a point Entity table that manages point Entities corresponding to point Specs shown in the point Spec table.

FIG. 9B is a diagram showing an example of a design of a point Entity table that manages point Entities corresponding to point Specs shown in the point Spec table.

FIG. 10A is a diagram showing an example of a design of a plane Entity table that manages plane Entities corresponding to plane Specs shown in the plane Spec table.

FIG. 10B is a diagram showing an example of a design of a plane Entity table that manages plane Entities corresponding to plane Specs shown in the plane Spec table.

FIG. 12 is a diagram showing an example of a line Entity table showing line Entities stored in an information object DB.

FIG. 13A is a diagram showing an example of a point Entity table showing point Entities stored in the information object DB.

FIG. 13B is a diagram showing an example of a point Entity table showing point Entities stored in the information object DB.

FIG. 14 is a diagram showing an example of a point Entity table showing point Entities stored in the information object DB.

FIG. 15 is a diagram showing an example of a plane Entity table showing plane Entities stored in the information object DB.

DESCRIPTION OF EMBODIMENTS

Figure 1:
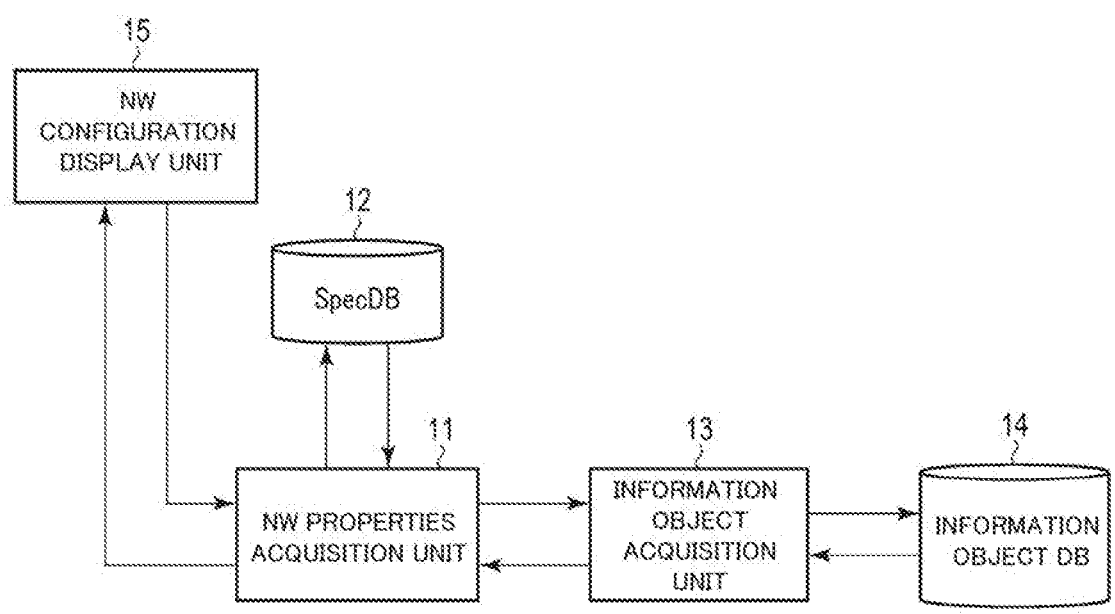
FIG. 1 is a diagram illustrating an application example of a network management device according to an embodiment of the present invention.

An embodiment according to this invention will be described below with reference to the Figures. FIG. 1 is a diagram illustrating an application example of a network management device according to an embodiment of the present invention. The network management device according to the embodiment of the present invention can be configured as a computer provided with a central processing unit (Central Processing Unit: CPU), program memory, computing memory, and so forth. This network management device is provided with a NW properties acquisition unit 11, a Spec DB (database) (NW properties storage unit) 12, information object acquisition unit 13, information object DB (information object storage unit) (may be also referred to as Entity DB) 14, and a NW configuration display unit 15, as functions necessary to carry out this embodiment, as illustrated in FIG. 1.

The NW properties acquisition unit 11, information object acquisition unit 13, and NW configuration display unit 15 can be realized by the CPU executing a program stored in program memory. The Spec DB 12 and information object DB 14 can be realized by storage devices such as nonvolatile memory or the like, and the NW configuration display unit 15 can be realized by including a liquid crystal display or the like. Note that the network management device can also be configured by hardware. Note however, that the network management device can also be realized by a combination of a known computer where a program having the procedures shown in later-described flowcharts having been installed via a medium or communication line, and the following (1) or (2), or the like.

(1) Spec DB 12 and information object DB 14
(2) Computer having Spec DB 12 and information object DB 14

The network management device stores definitions of NW configurations as specifications, and manages each piece of NW information based on these specifications. NW information is managed as information objects of points, lines, and planes.

The NW configuration display unit 15 performs screen display of point information, line information, and plane information, which are information objects (Entity). Point information indicates a terminal point of communication traffic, line information indicates the flow of communication over a network, and plane information indicates the range of flow of communication.

The NW properties acquisition unit 11 acquires NW properties (Spec), which is necessary at the time of performing screen display of the NW configuration, from the Spec DB 12.

The information object acquisition unit 13 acquires information objects corresponding to NW properties. Note that the relation between NW properties and information objects is described in the Specification of Japanese Patent Application No. 2016-220806.

NW properties (Spec) are stored in the Spec DB 12. Information objects (Entity) corresponding to the NW properties are stored in the information object DB 14. That is to say, in the present embodiment, NW properties and information objects are each managed separately. NW properties are stored in the Spec DB 12 for each protocol layer. Information objects are stored in the information object DB 14 for each protocol layer.

NW properties and information objects are classified into (1) information of points, lines, and planes common to the protocol (information of common attributes), and (2) accompanying information of points, lines, and planes specialized to the protocol (information of specialized attributes).

Figure 2:
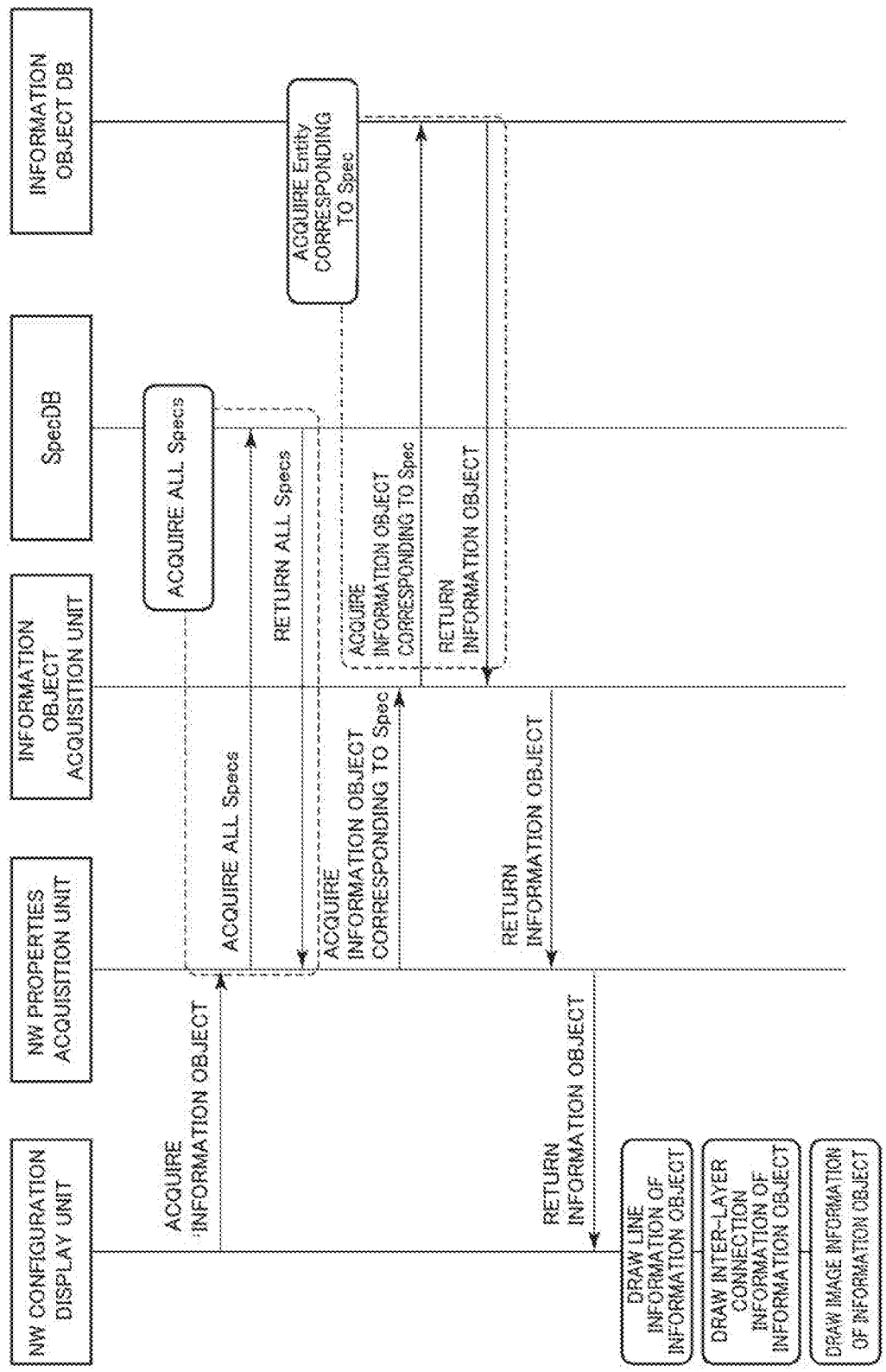
FIG. 2 is a sequence diagram illustrating an example of exchange between parts of the network management device according to the embodiment of the present invention.

FIG. 2 is a sequence diagram illustrating an example of exchange between parts of the network management device according to the embodiment of the present invention.

Upon receiving an external instruction to perform a NW configuration display, by operation of an input device omitted from illustration for example, such as a keyboard, mouse, or the like, for example, the NW configuration display unit 15 instructs the NW properties acquisition unit 11 to acquire information objects of the NW that is the object of display, and performs a screen display of information objects acquired by this instruction.

Out of the acquired information, the NW configuration display unit 15 draws information of common attributes as shapes in one process, and displays information of specialized attributes as character strings in the drawing. Information of common attributes is, for example, coordinates, dependency relations, connection relations, communication range, communication status, and so forth. Information of specialized attributes is, for example, wavelength Nos., Port Nos., IP addresses, ring names, and so forth.

The NW properties acquisition unit 11 receives the instruction from the NW configuration display unit 15, acquires all NW properties stored in the Spec DB 12, and instructs the information object acquisition unit 13 to acquire information objects corresponding to the acquired NW properties.

The information object acquisition unit 13 acquires information objects corresponding to the NW properties from the information object DB 14, and returns the acquired information objects to the NW properties acquisition unit 11.

The NW configuration display unit 15 draws line information of the information objects as the above screen display, draws connection information among layers of the information objects, and draws plane information of the information objects.

Figure 3:
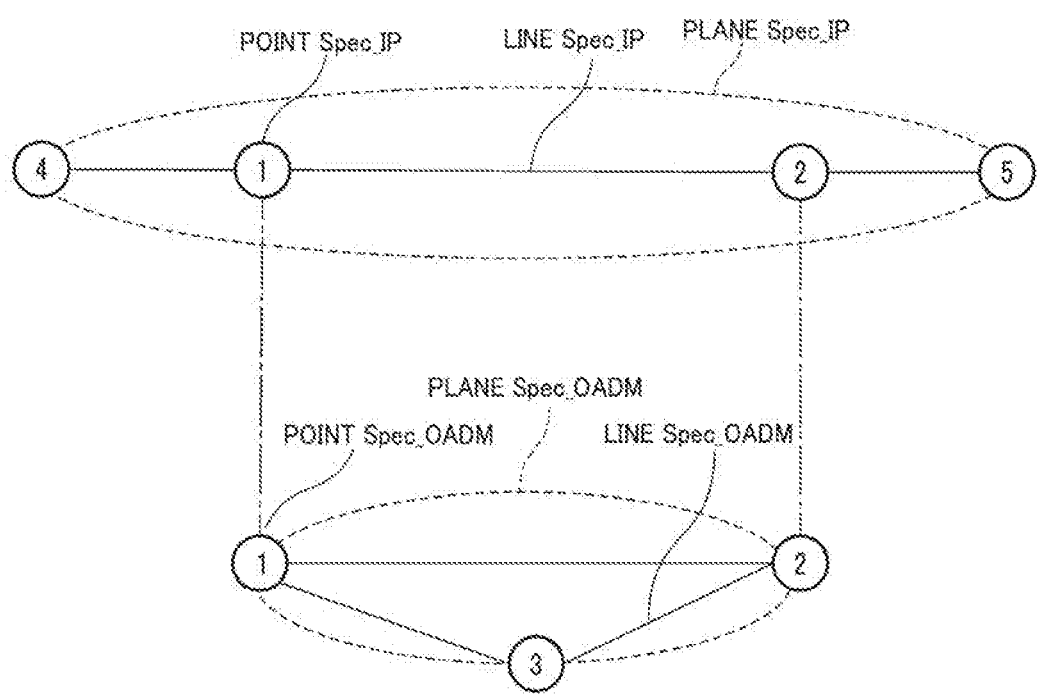
FIG. 3 is a diagram illustrating an example of a NW configuration of an IP layer and OADM layer.

FIG. 3 is a diagram illustrating an example of a NW configuration of an IP layer and OADM (optical add-drop multiplexer) layer.

In the OADM layer illustrated in FIG. 3, NW properties include point Spec_OADM that is point information, line Spec_OADM that is line information, and plane Spec_OADM that is plane information.

In the example illustrated in FIG. 3, three point Spec_OADMs, three line Spec_OADMs, and one plane Spec_OADM are defined in the OADM layer. The point Spec_OADMs include a "No. 1" point Spec_OADM, a "No. 2" point Spec_OADM, and a "No. 3" point Spec_OADM.

The first line Spec_OADM illustrated in FIG. 3 is a line Spec_OADM connecting the "No. 1" and "No. 2" point Spec_OADMs.

The second line Spec_OADM is a line Spec_OADM connecting the "No. 2" and "No. 3" point Spec_OADMs.

The third line Spec_OADM is a line Spec_OADM connecting the "No. 1" and "No. 3" point Spec_OADMs.

The plane Spec_OADM illustrated in FIG. 3 is a plane Spec_OADM that includes each of all point Spec_OADMs and all line Spec_OADMs.

Also, in the IP layer illustrated in FIG. 3, NW properties include point Spec_IP that is point information, line Spec_IP that is line information, and plane Spec_IP that is plane information.

In the example illustrated in FIG. 3, four point Spec_IPs, three line Spec_IPs, and one plane Spec_IP are defined in the IP layer. The point Spec_IPs include a "No. 1" point Spec_IP, "No. 2" point Spec_IP, "No. 4" point Spec_IP, and "No. 5" point Spec_IP.

The first line Spec_IP illustrated in FIG. 3 is a line Spec_OADM that connects the "No. 1" and "No. 2" point Spec_OADMs.

The second line Spec_IP is a line Spec_IP that connects the "No. 1" and "No. 4" point Spec_IPs.

The third line Spec_IP is a line Spec_IP that connects the "No. 2" and "No. 5" point Spec_IPs.

The plane Spec_IP illustrated in FIG. 3 is a plane Spec_IP that includes each of all point Spec_IPs and all line Spec_IPs.

The "No. 1" point Spec_OADM in the OADM layer and the "No. 1" point Spec_IP in the IP layer are point Specs having inter-layer connection. This is also the same for the "No. 2" point Spec_OADM in the OADM layer and the "No. 2" point Spec_IP in the IP layer.

Figure 4:
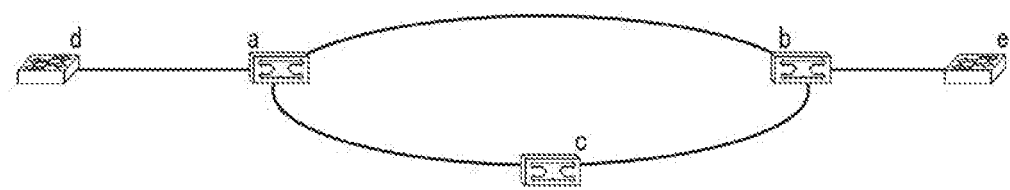
FIG. 4 is a diagram illustrating an example of a NW configuration of a physical layer configured of IP and OADM.

FIG. 4 is a diagram illustrating an example of a NW configuration of a physical layer configured of IP and OADM.

A device a on the physical layer illustrated in FIG. 4 corresponds to the "No. 1" point Spec_OADM in the OADM layer and the "No. 1" point Spec_IP in the IP layer.

A device b on the physical layer illustrated in FIG. 4 corresponds to the "No. 2" point Spec_OADM in the OADM layer and the "No. 2" point Spec_IP in the IP layer.

A device c on the physical layer illustrated in FIG. 4 corresponds to the "No. 3" point Spec_OADM in the OADM layer.

A device d on the physical layer illustrated in FIG. 4 corresponds to the "No. 4" point Spec_IP in the IP layer.

A device e on the physical layer illustrated in FIG. 4 corresponds to the "No. 5" point Spec_IP in the IP layer.

Next, a design case of point Specs, line Specs, and plane Specs, for storing the NW configuration information illustrated in FIG. 3, will be shown. Each type of Spec is managed as a table in the Spec DB 12.

FIG. 5 is a diagram showing a design case of a line Spec table showing line Specs stored in a Spec DB. FIG. 6 is a diagram showing a design case of a point Spec table showing point Specs stored in a Spec DB. FIG. 7 is a diagram showing a design case of a plane Spec table showing plane Specs stored in a Spec DB.

In the line Spec table, specName of line Spec (name of Spec), attribute name, valueFrom, valueTo, and type of value are each defined. specName is the name of the Spec, valueFrom is the lower limit value of a value that can be stored, and valueTo is the upper limit value of a value that can be input.

In the point Spectable, specName of point Spec, attribute name, valueFrom, valueTo, and type of value are each defined.

In the plane Spec table, specName of plane Spec, attribute name, valueFrom, valueTo, and type of value are each defined.

Of the attribute names shown in FIGS. 5, 6, and 7, attribute names encompassed by lines a are common attribute information that is not dependent on protocol type (common attributes).

Of the attribute names shown in FIGS. 5, 6, and 7, attribute names encompassed by lines b are attribute information specialized with regard to a protocol (specialized attributes).

Next, the configuration of the line Spec table will be described.

The combination of "specName, attribute name, valueFrom, valueTo, type of value" of each row in the line Spec table shown in FIG. 5 is the following (line Spec_OADM, connection relation) through (line Spec_IP, Port No.) below.

(line Spec_OADM, connection relation) "line Spec_OADM, connection relation, -(undefined), -, array having point Entity_OADM"

(line Spec_OADM, wavelength No.) "line Spec_OADM, wavelength No., 1, 100, character string (wavelength)" (line Spec_IP, connection relation) "line Spec_IP, connection relation, -, -, array having point Entity_IP"

(line Spec_IP, Port No.) "line Spec_IP, Port No., 0, 65535, Int"

Next, the configuration of the point Spec table will be described.

The combination of "specName, attribute name, valueFrom, valueTo, type of value" in each row in the point Spec table shown in FIG. 6 is the following (point Spec_OADM, wavelength No.) through (point Spec_IP, dependency relation) below.

(point Spec_OADM, wavelength No.) "point Spec_OADM, wavelength No., λ1, λ10, string"

(point Spec_OADM, x coordinate) "point Spec_OADM, x coordinate, 0, 65535, int"

(point Spec_OADM, y coordinate) "point Spec_OADM, y coordinate, 0, 65535, int"

(point Spec_OADM, dependency relation) "point Spec_OADM, dependency relation, -, -, point Spec_IP"

(point Spec_IP, IP address) "point Spec_IP, IP address, 0.0.0.0, 255.255.255.0, ipAddress"

(point Spec_IP, x coordinate) "point Spec_IP, x coordinate, 0, 65535, int"

(point Spec_IP, y coordinate) "point Spec_IP, y coordinate, 0, 65535, int"

(point Spec_IP, dependency relation) "point Spec_IP, dependency relation, -, -, null"

Next, the configuration of the plane Spec table will be described.

The combination of "specName, attribute name, valueFrom, valueTo, type of value" in each row in the plane Spec table shown in FIG. 7 is the following (plane Spec_OADM, communication range) through (plane Spec_IP, communication status) below.

(plane Spec_OADM, communication range) "plane Spec_OADM, communication range, -, -, array having point Entity_OADM"

(plane Spec_OADM, communication status) "plane Spec_OADM, communication status, -, -, string (Established/LinkDown)"

(plane Spec_OADM, ring name) "plane Spec_OADM, ring name, -, -, string (light wavelength pathname)"

(plane Spec_IP, communication range) "plane Spec_IP, communication range, -, -, array having point Entity_IP"

(plane Spec_IP, communication status) "plane Spec_IP, communication status, -, -, string"

Next, an example of designing information objects corresponding to Specs will be shown.

FIG. 8A and FIG. 8B are diagrams showing an example of a design of a line Entity table that manages line Entities corresponding to line Specs, out of line Specs shown in the line Spec table.

In the line Entity table, entityName of line Entity (name of Entity), attribute name, value (value of Entity), and dependent Spec, are each defined.

In the example shown in FIG. 8A and FIG. 8B, the combination of "specName, attribute name, valueFrom, valueTo, and type of value" of each row in the line Spec table shown in FIG. 5 is the base for designing the line Entity table.

In the example shown in FIG. 8A and FIG. 8B, the combination of "entityName, attribute name, dependent Spec" of each row in the line Entity table corresponding to the combination shown as (line Spec_OADM, connection relation), (line Spec_IP, connection relation) of each row above in the line Spec table shown in FIG. 5 is the (line Entity_OADM, connection relation) through (line Entity_IP, Port No.) below. Here, value is not defined in the line Entity table.

(line Entity_OADM, connection relation) "line Entity_OADM, connection relation, line Spec_OADM"

(line Entity_OADM, wavelength No.) "line Entity_OADM, wavelength No., line Spec_OADM"

(line Entity_IP, connection relation) "line Entity_IP, connection relation, line Spec_IP"

(line Entity_IP, Port No.) "line Entity_IP, Port No., line Spec_IP"

FIG. 9A and FIG. 9B are diagrams showing an example of a design of a point Entity table that manages point Entities corresponding to point Specs shown in the point Spec table.

In the point Entity table shown in FIG. 9B, entityName of point Entity, attribute name, value, and dependent Spec are each defined.

In the example shown in FIG. 9A and FIG. 9B, the combination of "specName, attribute name, valueFrom, valueTo, and type of value" of each row in the point Spec table shown in FIG. 6 is the base for designing the point Entity table.

In the example shown in FIG. 9A and FIG. 9B, the combination of "entityName, attribute name, dependent Spec" of each row in the point Entity table corresponding to the combination shown as (point Spec_OADM, wavelength No.) through (point Spec_IP, dependency relation) of each row above in the point Spec table shown in FIG. 6 is the (point Entity_OADM, wavelength No.) through (point Entity_IP, dependency relation) below. Here, value is not defined in the point Entity table.

(point Entity_OADM, wavelength No.) "point Entity_OADM, wavelength No., point Spec_OADM"

(point Entity_OADM, x coordinate) "point Entity_OADM, x coordinate, point Spec_OADM"

(point Entity_OADM, y coordinate) "point Entity_OADM, y coordinate, point Spec_OADM"

(point Entity_OADM, dependency relation) "point Entity_OADM, dependency relation, point Spec_OADM"

(point Entity_IP, IP address) "point Entity_IP, IP address, point Spec_IP"

(point Entity_IP, x coordinate) "point Entity_IP, x coordinate, point Spec_IP"

(point Entity_IP, y coordinate) "point Entity_IP, y coordinate, point Spec_IP"

(point Entity_IP, dependency relation) "point Entity_IP, dependency relation, null"

FIG. 10A and FIG. 10B are diagrams showing an example of a design of a plane Entity table that manages plane Entities corresponding to plane Specs shown in the plane Spec table.

In the plane Entity table shown in FIG. 10B, entityName of line Entity, attribute name, value, and dependent Spec are each defined.

In the example shown in FIG. 10A and FIG. 10B, the combination of "specName, attribute name, valueFrom, valueTo, and type of value" of each row in the plane Spec table shown in FIG. 7 is the base for designing the plane Entity table.

In the example shown in FIG. 10A and FIG. 10B, the combination of "entityName, attribute name, dependent Spec" of each row in the plane Entity table corresponding to the combination shown as (plane Spec_OADM, communication range) through (plane Spec_IP, communication status) above in the plane Spec table shown in FIG. 7 is the (plane Entity_OADM, communication range) through (plane Entity_IP, communication status) below. Here, value is not defined in the plane Entity table.

(plane Entity_OADM, communication range) "plane Entity_OADM, communication range, plane Spec_OADM"

(plane Entity_OADM, communication status) "plane Entity_OADM, communication status, plane Spec_OADM"

(plane Spec_OADM, ring name) "plane Spec_OADM, ring name, plane Spec_OADM"

(plane Entity_IP, communication range) "plane Entity_IP, communication range, plane Spec_IP"

(plane Entity_IP, communication status) "plane Entity_IP, communication status, plane Spec_IP"

Figure 11:
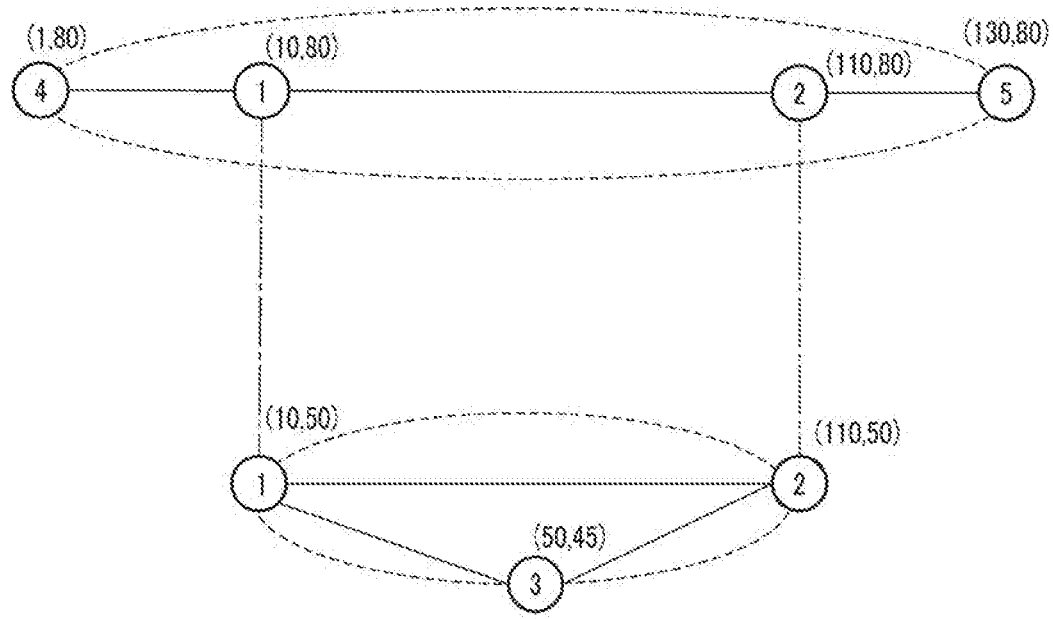
FIG. 11 is a diagram illustrating an example of a NW configuration that includes coordinate information of the IP layer and OADM layer.

FIG. 11 is a diagram illustrating an example of a NW configuration that includes coordinate information of the IP and OADM layers.

In the example illustrated in FIG. 11, the coordinates (x coordinate, y coordinate) of the "No. 1" point Spec_OADM of the OADM layer are (10, 50), the coordinates of the "No. 2" point Spec_OADM of the OADM layer are (110, 50), and the coordinates of the "No. 3" point Spec_OADM of the OADM layer are (50, 45).

Also, in the example illustrated in FIG. 11, the coordinates of the "No. 1" point Spec_IP of the IP layer are (10, 80), the coordinates of the "No. 2" point Spec_IP of the IP layer are (110, 80), the coordinates of the "No. 4" point Spec_IP of the IP layer are (1, 80), and the coordinates of the "No. 5" point Spec_IP of the IP layer are (130, 80).

Next, a case of storing point information, line information, and plane information for storing information of the NW configuration illustrated in FIG. 11 in the information object DB 14 will be shown.

FIG. 12 is a diagram showing an example of a line Entity table showing line Entities stored in the information object DB.

In the line Entity table shown in FIG. 12, entityName of line Entity, attribute name, value, and dependent Spec are each defined.

The combination of "entityName, attribute name, value, dependent Spec" of each row in the line Entity table shown in FIG. 12 is the (line Entity_OADM_1, connection relation) through (line Entity_IP_4, Port No.) below.

(line Entity_OADM_1, connection relation) "line Entity_OADM_1, connection relation, [1, 2], line Spec_OADM"

(line Entity_OADM_1, wavelength No.) "line Entity_OADM_1, wavelength No., λ10, line Spec_OADM"

(line Entity_OADM_2, connection relation) "line Entity_OADM_2, connection relation, [1, 3], line Spec_OADM"

(line Entity_OADM_2, wavelength No.) "line Entity_OADM_2, wavelength No., λ10, line Spec_OADM"

(line Entity_OADM_3, connection relation) "line Entity_OADM_3, connection relation, [2, 3], line Spec_OADM"

(line Entity_OADM_3, wavelength No.) "line Entity_OADM_3, wavelength No., λ10, line Spec_OADM"

(line Entity_IP_4, connection relation) "line Entity_IP_4, connection relation, [4, 1, 2, 5], line Spec_IP"

(line Entity_IP_4, Port No.) "line Entity_IP_4, Port No., 10, line Spec_IP"

Next, the correlation between the line Entity table shown in FIG. 8B and the line Entity table shown in FIG. 12 will be described.

Of the rows in the line Entity table shown in FIG. 8B, the row of (line Entity_OADM, connection relation) corresponds to the rows of (line Entity_OADM_1, connection relation), (line Entity_OADM_2, connection relation), and (line Entity_OADM_3, connection relation) in the plane Entity table shown in FIG. 12.

Of the rows in the line Entity table shown in FIG. 8B, the row of (line Entity_OADM, wavelength No.) corresponds to the rows of (line Entity_OADM_1, wavelength No.), (line Entity_OADM_2, wavelength No.), and (line Entity_OADM_3, wavelength No.) in the plane Entity table shown in FIG. 12.

Of the rows in the line Entity table shown in FIG. 8B, the row of (line Entity_IP, connection relation) corresponds to the row of (line Entity_IP_4, connection relation) in the line Entity table shown in FIG. 12.

Of the rows in the line Entity table shown in FIG. 8B, the row of (line Entity_IP, Port No.) corresponds to the row of (line Entity_IP_4, Port No.) in the line Entity table shown in FIG. 12.

FIG. 13A, FIG. 13B, and FIG. 14 are diagrams showing an example of point Entity tables showing point Entities stored in the information object DB.

In the point Entity tables shown in FIG. 13A, FIG. 13B, and FIG. 14, entityName of point Entity, attribute name, value, and dependent Spec are each defined.

The combination of "entityName, attribute name, dependent Spec" in the point Entity table shown in FIG. 13A and FIG. 13B is the (point Entity_OADM_1, wavelength No.) through (point Entity_IP_5, dependency relation) below.

(point Entity_OADM_1, wavelength No.) "point Entity_OADM_1, wavelength No., λ1, point Spec_OADM"

(point Entity_OADM_1, x coordinate) "point Entity_OADM_1, x coordinate, 10, point Spec_OADM"

(point Entity_OADM_1, y coordinate) "point Entity_OADM_1, y coordinate, 50, point Spec_OADM"

(point Entity_OADM_1, dependency relation) "point Entity_OADM_1, dependency relation, point Entity_IP_1, point Spec_OADM"

(point Entity_OADM_2, wavelength No.) "point Entity_OADM_2, wavelength No., λ1, point Spec_OADM"

(point Entity_OADM_2, x coordinate) "point Entity_OADM_2, x coordinate, 110, point Spec_OADM"

(point Entity_OADM_2, y coordinate) "point Entity_OADM_2, y coordinate, 50, point Spec_OADM"

(point Entity_OADM_2, dependency relation) "point Entity_OADM_2, dependency relation, point Entity_IP_2, point Spec_OADM"

(point Entity_OADM_3, wavelength No.) "point Entity_OADM_3, wavelength No., λ1, point Spec_OADM"

(point Entity_OADM_3, x coordinate) "point Entity_OADM_3, x coordinate, 50, point Spec_OADM"

(point Entity_OADM_3, y coordinate) "point Entity_OADM_3, y coordinate, 45, point Spec_OADM"

(point Entity_OADM_3, dependency relation) "point Entity_OADM_3, dependency relation, null, point Spec_OADM"

(point Entity_IP_4, IP address) "point Entity_IP_4, IP address, IP_4, point Spec_IP"

(point Entity_IP_4, x coordinate) "point Entity_IP_4, x coordinate, 1, point Spec_IP"

(point Entity_IP_4, y coordinate) "point Entity_IP_4, y coordinate, 80, point Spec_IP"

(point Entity_IP_4, dependency relation) "point Entity_IP_4, dependency relation, null, point Spec_IP"

(point Entity_IP_5, IP address) "point Entity_IP_5, IP address, IP_5, point Spec_IP"

(point Entity_IP_5, x coordinate) "point Entity_IP_5, x coordinate, 130, point Spec_IP"

(point Entity_IP_5, y coordinate) "point Entity_IP_5, y coordinate, 80, point Spec_IP"

(point Entity_IP_5, dependency relation) "point Entity_IP_5, dependency relation, null, point Spec_IP"

The combination of "entityName, attribute name, dependent Spec" in the point Entity table (part of IP layer) shown in FIG. 14 is the (point Entity_IP_1, IP address) through (point Entity_IP_2, y coordinate) below.

(point Entity_IP_1, IP address) "point Entity_IP_1, IP address, IP_1, point Spec_IP"

(point Entity_IP_1, x coordinate) "point Entity_IP_1, x coordinate, 10, point Spec_IP"

(point Entity_IP_1, y coordinate) "point Entity_IP_1, y coordinate, 80, point Spec_IP"

(point Entity_IP_2, IP address) "point Entity_IP_2, IP address, IP_2, point Spec_IP"

(point Entity_IP_2, x coordinate) "point Entity_IP_2, x coordinate, 110, point Spec_IP"

(point Entity_IP_2, y coordinate) "point Entity_IP_2, y coordinate, 80, point Spec_IP"

Next, the correlation between the point Entity table shown in FIG. 9B and the point Entity tables shown in FIG. 13A, FIG. 13B, and FIG. 14 will be described.

Of the rows in the point Entity table shown in FIG. 9B, the above row (point Entity_OADM, wavelength No.) corresponds to the rows of (point Entity_OADM_1, wavelength No.), (point Entity_OADM_2, wavelength No.), and (point Entity_OADM_3, wavelength No.) in the point Entity table shown in FIG. 13A.

Of the rows in the point Entity table shown in FIG. 9B, the above row (point Entity_OADM, x coordinate) corresponds to the rows of (point Entity_OADM_1, x coordinate), (point Entity_OADM_2, x coordinate), and (point Entity_OADM_3, x coordinate) in the point Entity table shown in FIG. 13A.

Of the rows in the point Entity table shown in FIG. 9B, the above row (point Entity_OADM, y coordinate) corresponds to the rows of (point Entity_OADM_1, y coordinate), (point Entity_OADM_2, y coordinate), and (point Entity_OADM_3, y coordinate) in the point Entity table shown in FIG. 13A.

Of the rows in the point Entity table shown in FIG. 9B, the above row (point Entity_OADM, dependency relation) corresponds to the rows of (point Entity_OADM_1, dependency relation), (point Entity_OADM_2, dependency relation), and (point Entity_OADM_3, dependency relation) in the point Entity table shown in FIG. 13A.

Of the rows in the point Entity table shown in FIG. 9B, the above row (point Entity_IP, IP address) corresponds to the rows of (1) and (2) below.

(1) rows of (point Entity_IP_4, IP address) and (point Entity_IP_5, IP address) in the point Entity table shown in FIG. 13B (2) rows of (point Entity_IP_1, IP address) and (point Entity_IP_2, IP address) in the point Entity table shown in FIG. 14

Of the rows in the point Entity table shown in FIG. 9B, the above row (point Entity_IP, x coordinate) corresponds to the rows of (1) and (2) below.

(1) rows of (point Entity_IP_4, x coordinate) and (point Entity_IP_5, x coordinate) in the point Entity table shown in FIG. 13B (2) rows of (point Entity_IP_1, x coordinate) and (point Entity_IP_2, x coordinate) in the point Entity table shown in FIG. 14

Of the rows in the point Entity table shown in FIG. 9B, the above row (point Entity_IP, y coordinate) corresponds to the rows of (1) and (2) below.

(1) rows of (point Entity_IP_4, y coordinate) and (point Entity_IP_5, y coordinate) in the point Entity table shown in FIG. 13B (2) rows of (point Entity_IP_1, y coordinate) and (point Entity_IP_2, y coordinate) in the point Entity table shown in FIG. 14

Of the rows in the point Entity table shown in FIG. 9B, the above row (point Entity_IP, dependency relation) corresponds to the rows of (point Entity_IP_4, dependency relation) and (point Entity_IP_5, dependency relation) in the point Entity table shown in FIG. 13B.

FIG. 15 is a diagram showing an example of a plane Entity table showing plane Entities stored in the information object DB.

In the plane Entity table shown in FIG. 15, entityName of plane Entity, attribute name, value, and dependent Spec are each defined.

The combination of "entityName, attribute name, value, dependent Spec" of each row in the plane Entity table shown in FIG. 15 is the (plane Entity_OADM, communication range) through (plane Entity_IP, communication status) below.

(plane Entity_OADM, communication range) "plane Entity_OADM, communication range, [point 1, point 2, point 3], plane Spec_OADM"

(plane Entity_OADM, communication status) "plane Entity_OADM, communication status, established, plane Spec_OADM"

(plane Entity_OADM, ring name) "plane Entity_OADM, ring name, ring1, plane Spec_OADM"

(plane Entity_IP, communication range) "plane Entity_IP, communication range, [line 4], plane Spec_IP"

(plane Entity_IP, communication status) "plane Entity_IP, communication status, established, plane Spec_IP"

The rows in the plane Entity table shown in FIG. 10B correspond to the rows in the plane Entity table shown in FIG. 15 in a one-on-one manner.

Next, the meaning of value in the line Entity table shown in FIG. 12 above will be described below.

The value "[1, 2]" of the row related to entityName "line Entity_OADM_1" indicates a line configured of a connection relation between points relating to (1) and (2) below.

(1) a point defined by the two rows relating to entityName "point Entity_OADM_1" and attribute names "x coordinate" and "y coordinate" in the point Entity table shown in FIG. 13A (2) a point defined by the two rows relating to entityName "point Entity_OADM_2" and attribute names "x coordinate" and "y coordinate" in the point Entity table shown in FIG. 13A The value "[1, 3]" of the row related to entityName "line Entity_OADM_2" indicates a line configured of a connection relation between points relating to (1) and (2) below.

(1) a point defined by the two rows relating to entityName "point Entity_OADM_1" and attribute names "x coordinate" and "y coordinate" in the point Entity table shown in FIG. 13A (2) a point defined by the two rows relating to entityName "point Entity_OADM_3" and attribute names "x coordinate" and "y coordinate" in the point Entity table shown in FIG. 13A The value "[2, 3]" of the row related to entityName "line Entity_OADM_3" indicates a line configured of a connection relation between points relating to (1) and (2) below.

(1) a point defined by the two rows relating to entityName "point Entity_OADM_2" and attribute names "x coordinate" and "y coordinate" in the point Entity table shown in FIG. 13A (2) a point defined by the two rows relating to entityName "point Entity_OADM_3" and attribute names "x coordinate" and "y coordinate" in the point Entity table shown in FIG. 13A The value "[4, 1, 2, 5]" of the row related to entityName "line Entity_IP_4" indicates a line configured of a connection relation among points relating to (1), (2), (3), and (4) below.

(1) a point defined by the two rows relating to entityName "point Entity_IP_4" and attribute names "x coordinate" and "y coordinate" in the point Entity table shown in FIG. 13B (2) a point defined by the two rows relating to entityName "point Entity_IP_1" and attribute names "x coordinate" and "y coordinate" in the point Entity table shown in FIG. 14

(3) a point defined by the two rows relating to entityName "point Entity_IP_2" and attribute names "x coordinate" and "y coordinate" in the point Entity table shown in FIG. 14

(4) a point defined by the two rows relating to entityName "point Entity_IP_5" and attribute names "x coordinate" and "y coordinate" in the point Entity table shown in FIG. 13B The meaning of value in the plane Entity table shown in FIG. 15 will be described below.

The value "[point 1, point 2, point 3]" of the row related to entityName "plane Entity_OADM" and attribute name "communication range" indicates a plane including points relating to (1), (2), and (3) below.

(1) a point defined by the two rows relating to entityName "point Entity_OADM_1" and attribute names "x coordinate" and "y coordinate" in the point Entity table shown in FIG. 13A (2) a point defined by the two rows relating to entityName "point Entity_OADM_2" and attribute names "x coordinate" and "y coordinate" in the point Entity table shown in FIG. 13A (3) a point defined by the two rows relating to entityName "point Entity_OADM_3" and attribute names "x coordinate" and "y coordinate" in the point Entity table shown in FIG. 13A The value "[line 4]" of the row related to entityName "plane Entity_IP" indicates a plane including a line defined by a row relating to entityName "line Entity_IP_4" and attribute name "connection relation" in the line Entity table shown in FIG. 12.

Although the coordinates in the Entity tables stored in the information object DB 14 have been described above as being a two-dimensional coordinates system for both the OADM and IP layers, coordinate axes may be designed for each layer, and can be designed as three-dimensional coordinate systems.

The above design is realized by Spec design and information object design. Moreover, a coordinate system may be designed for each layer of information objects.

Figure 16:
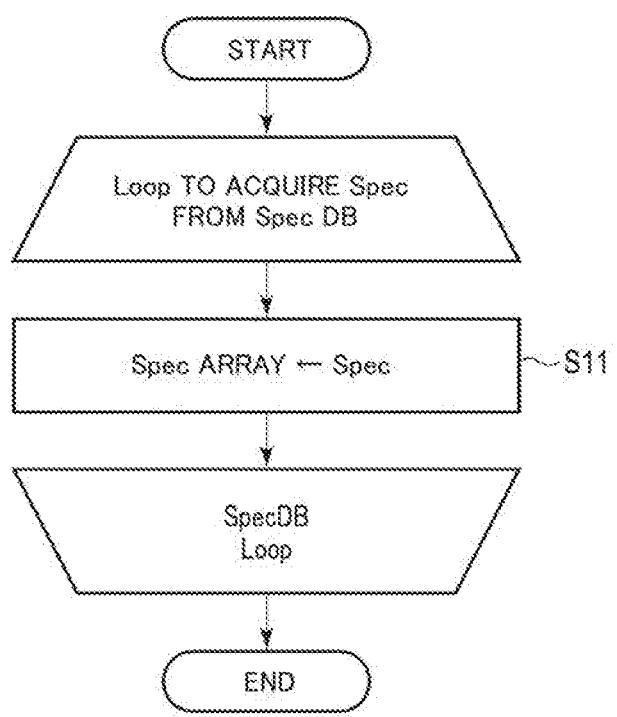
FIG. 16 is a flowchart illustrating an example of procedures of storing Specs stored in the Spec DB in a Spec array.

FIG. 16 is a flowchart illustrating an example of procedures of storing Specs stored in the Spec DB in a Spec array. This processing is processing of all Specs stored in the Spec DB 12 being stored in a Spec array.

First, the NW properties acquisition unit 11 starts a Loop process, selects one unselected row out of Specs of various types of Spec tables in the Spec DB 12, and acquires the Spec of this row.

The NW properties acquisition unit 11 stores this acquired Spec in a Spec array (S11), and returns to the top of the Loop process. When the Loop process ends, the NW properties acquisition unit 11 ends the process of storing Specs stored in the Spec DB 12 in the Spec array.

Figure 17:
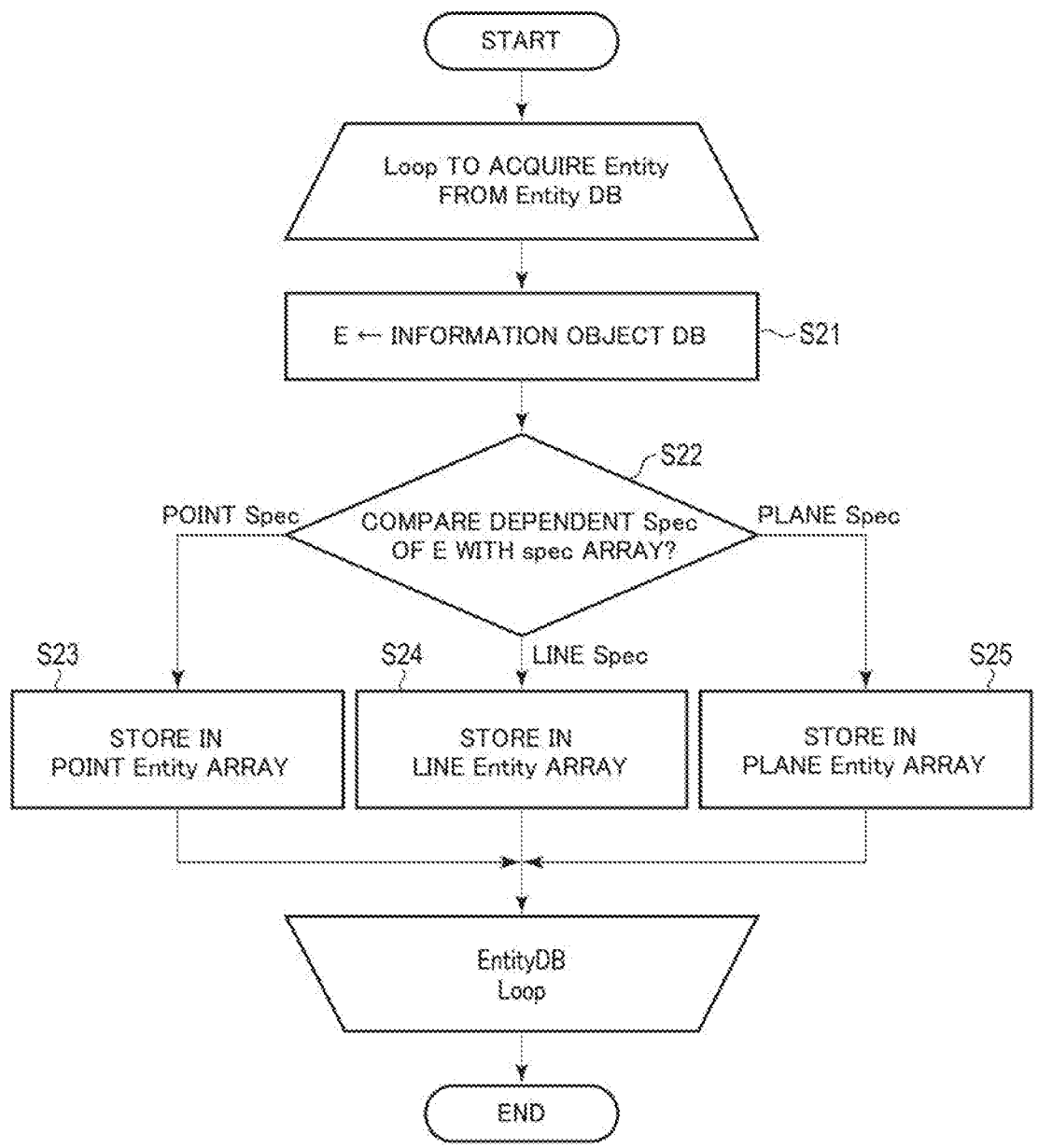
FIG. 17 is a flowchart illustrating an example of procedures of acquiring Entities corresponding to Specs.

FIG. 17 is a flowchart illustrating an example of procedures of acquiring Entities corresponding to Specs.

First, the NW properties acquisition unit 11 starts a Loop process in collaboration with the information object acquisition unit 13, acquires one unselected row worth of Entity (e.g., the row of which the entityName is point Spec_OADM_1, shown in FIG. 13A) from the various types of Entity tables stored in the information object DB 14, and sets this Entity to E (S21). The entityName, attribute name, value, and dependent Spec are defined for each row of an Entity table acquired at this point, as shown in FIG. 13A, FIG. 13B, and FIG. 14.

The NW properties acquisition unit 11 compares the dependent Spec of E described in S21 with a Spec array (S22).

If the dependent Spec of E is a point Spec (e.g., point Spec_OADM or point Spec_IP shown in FIG. 13A or FIG. 13B, or a point Spec_IP shown in FIG. 14), the NW properties acquisition unit 11 stores the value (e.g., λ1) of a row out of the rows in a point Spec table to which it is dependent corresponding to the specName that indicates the dependent Spec of E, and where the same attribute name as the attribute name of E is defined (e.g., a row where attribute name "wavelength No." is defined), in the value of E described above. Thus, the values of value of the point Spec table are stored in the point Entity array (point Entity table) (S23), and processing by the NW properties acquisition unit 11 returns to the top of the Loop process.

Also, if the dependent Spec of E is a line Spec (e.g., line Spec_OADM or line Spec_IP shown in FIG. 12), the NW properties acquisition unit 11 stores the value of a row out of the rows in a line spec table to which it is dependent corresponding to the specName that indicates the dependent Spec of E, and where the same attribute name as the attribute name of E is defined (e.g., a row where attribute name "connection relation" is defined), in the value of E described above. Thus, the values of value of the line Spec table are stored in the line Entity array (line Entity table) (S24), and processing by the NW properties acquisition unit 11 returns to the top of the Loop process.

Also, if the dependent Spec of E is a plane Spec (e.g., plane Spec_OADM or plane Spec_IP shown in FIG. 15), the NW properties acquisition unit 11 stores the value of a row out of the rows in a plane Spec table to which it is dependent corresponding to the specName that indicates the dependent Spec of E, and where the same attribute name as the attribute name of E is defined (e.g., a row where attribute name "communication range" is defined), in the value of E described above. Thus, the values of value of the plane Spec table are stored in the plane Entity array (plane Entity table) (S25), and processing by the NW properties acquisition unit 11 returns to the top of the Loop process.

When the Loop process ends, the process acquiring Entities corresponding to Specs ends. The results that have been acquired are sent from the NW properties acquisition unit 11 to the NW configuration display unit 15.

Next, drawing line information of an information object will be described.

Figure 18:
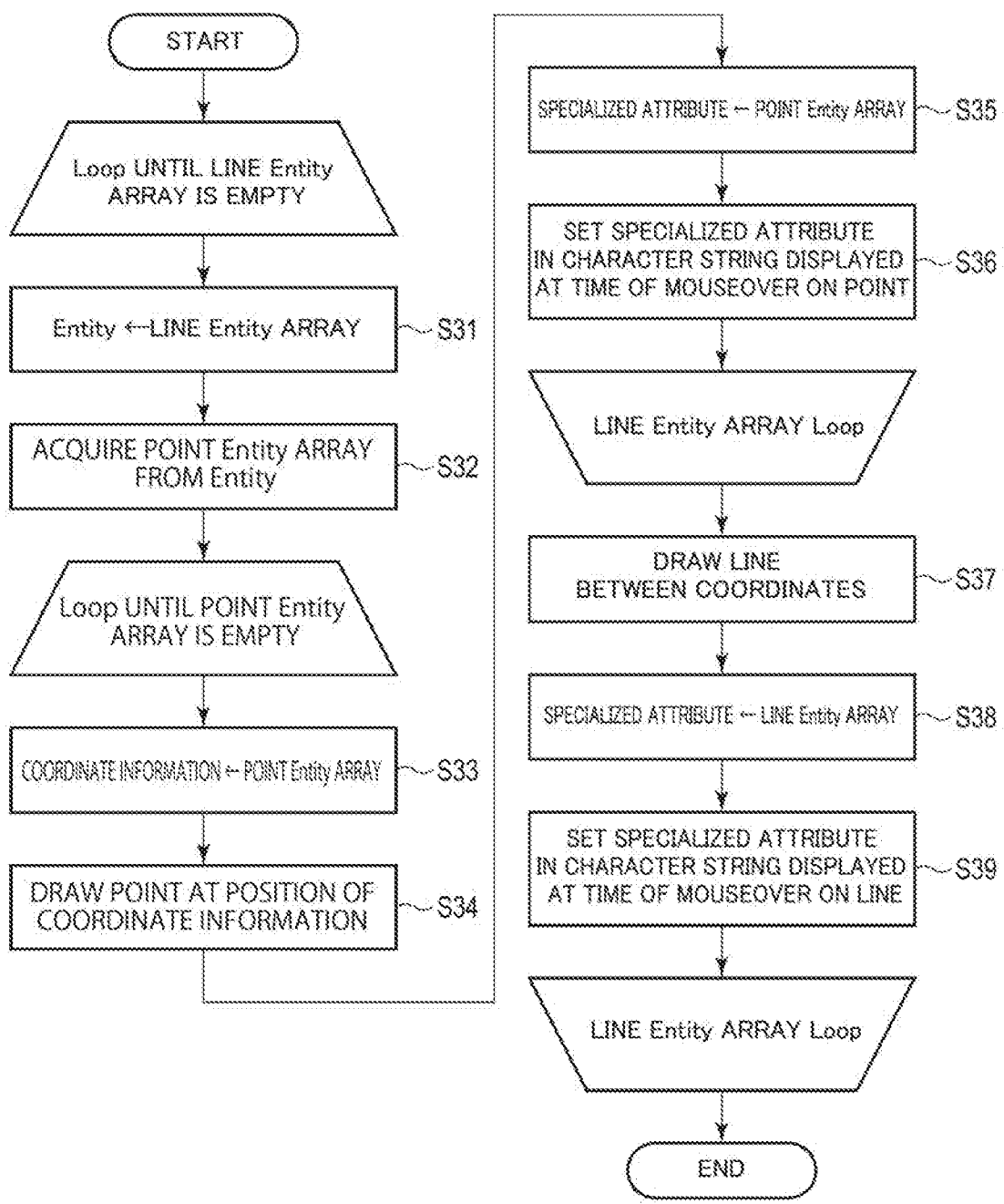
FIG. 18 is a flowchart illustrating an example of procedures of drawing line information of an information object.

FIG. 18 is a flowchart illustrating an example of procedures of drawing line information of an information object (Entity).

First, the NW configuration display unit 15 starts a first Loop process that is a Loop processing performed until unselected rows are gone from the rows of the line Entity table where values have been stored in S24. The NW configuration display unit 15 selects, of the rows of the line Entity table stored in the information object DB 14, a row that is unselected and also where the same entityName (e.g., "line Entity_OADM_1" shown in FIG. 12) is defined, and sets this selected row to be the Entity that is the object of processing (S31).

The NW configuration display unit 15 acquires a row where the entityName (e.g., "point Entity_OADM_1", "point Entity_OADM_2" shown in FIG. 13A) defined corresponds to the value (e.g., "[1, 2]" shown in FIG. 12) of the row where the attribute name "connection relation" is defined out of the Entities set in S31, from the point Entity table (S32).

The NW configuration display unit 15 starts a second Loop process that is a Loop process performed until unselected rows are gone from the array acquired in S32. The NW configuration display unit 15 selects, of the rows of the array acquired in S32, a row that is unselected and also where the same entityName (e.g., point Entity_OADM_1 shown in FIG. 13A) is defined.

The NW configuration display unit 15 extracts, from this selected row, each coordinate value relating to (1) and (2) below (S33).

(1) x coordinate value defined by value in a row where the attribute name is "x coordinate" (e.g., entityName "point Entity_OADM_1", "10" of row relating to attribute name "x coordinate", shown in FIG. 13A).

(2) y coordinate value defined by value in a row where the attribute name is "y coordinate" (e.g., entityName "point Entity_OADM_1", "50" of row relating to attribute name "y coordinate", shown in FIG. 13A).

The NW configuration display unit 15 generates an image where a point has been drawn at a position corresponding to the coordinate information extracted in S33 (S34).

The NW configuration display unit 15 extracts, from the rows selected in S31 above, a specialized attribute name (e.g., λ10) defined by the value of a row where the attribute name is a specialized attribute (e.g., wavelength No.) (S35).

The NW configuration display unit 15 sets the specialized attribute extracted in S35 to a character string displayed at the time of mouseover on the point drawn in S34 (S36), and returns to the top of the second Loop process.

When the second Loop process ends, the NW configuration display unit 15 generates an image where a line has been drawn between the coordinates extracted in S33 in this second Loop process (S37).

The NW configuration display unit 15 extracts a specialized attribute name (e.g., λ1) that is defined by value in a row where the attribute name is a specialized attribute (e.g., wavelength No.), of rows selected from the line Entity table in S31 (S38).

The NW configuration display unit 15 sets the specialized attribute extracted in S38 to a character string displayed at the time of mouseover on the line drawn in S37 (S39), and returns to the top of the first Loop process.

When the first Loop process ends, the NW configuration display unit 15 displays the image generated so far, and ends the procedures of drawing line information of the information object.

Performing the procedures such as described above enables drawing that is not dependent on protocol type.

Figure 19:
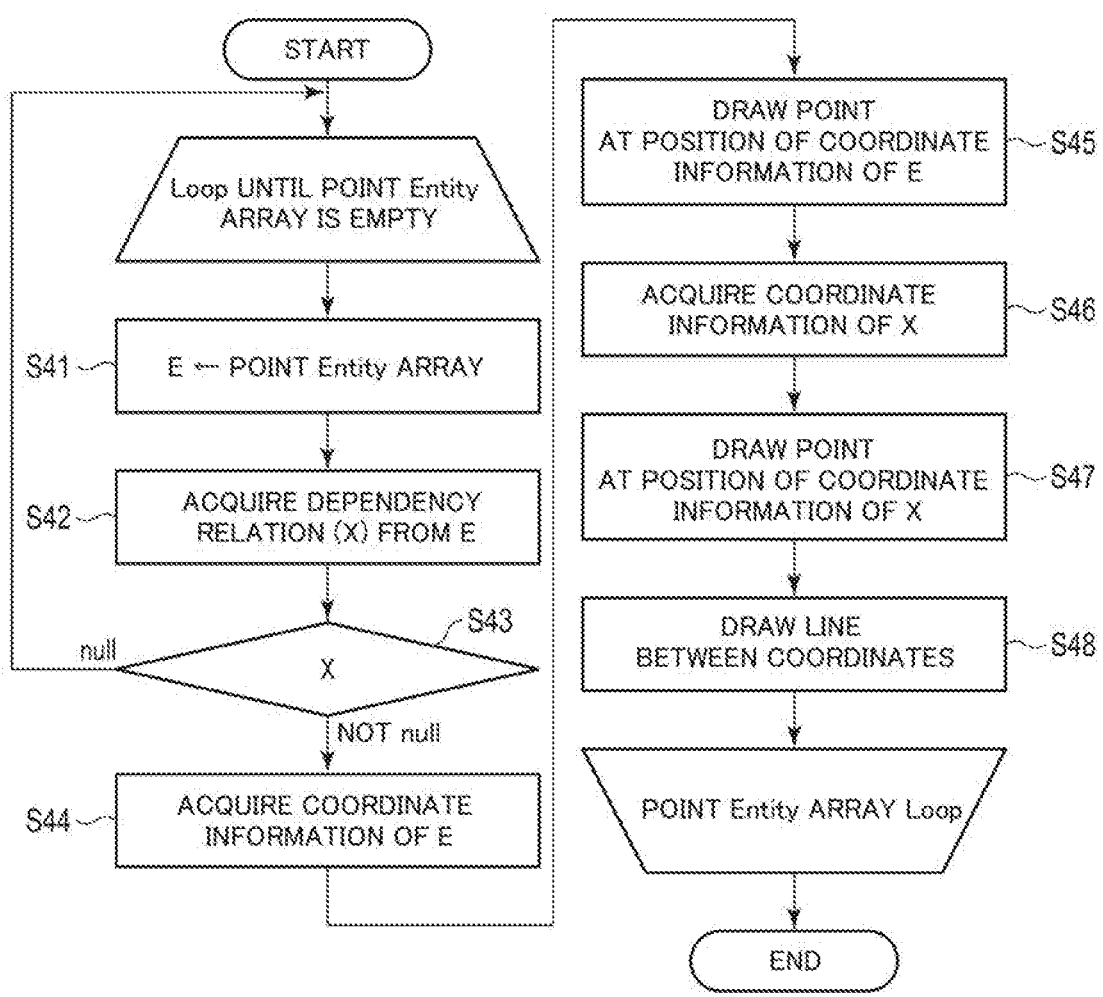
FIG. 19 is a flowchart illustrating an example of procedures of drawing a connection relation of point information of an information object.

Next, drawing connection relations among layers (inter-layer correspondence relations) of information objects (Entities) will be described. FIG. 19 is a flowchart illustrating an example of procedures of drawing a connection relation of point information of an information object.

First, the NW configuration display unit 15 starts a first Loop process that is a Loop processing performed until unselected rows are gone from the rows of the point Entity table where values have been stored in S23. The NW configuration display unit 15 selects, of the rows of the point Entity table stored in the information object DB 14, a row that is unselected and also where the same entityName (e.g., point Entity_OADM_1 shown in FIG. 13A) is defined, and sets this selected row to be E that is the object of processing (S41).

The NW configuration display unit 15 extracts, from the rows of E set in S41, a row where entityName (e.g., point Entity_IP_1 shown in FIG. 14) indicating a dependency relation (X) defined by the value of the row relating to the attribute name "dependency relation" is defined (S42).

In a case where the value of a row, out of the rows corresponding to X extracted in S42, where the attribute name is "x coordinate", "x coordinate" is null (null in S43), the processing by the NW configuration display unit 15 returns to the top of the first Loop process.

Conversely, in a case where the value of a row, out of the rows corresponding to X extracted in S42, where the attribute name is "x coordinate", "x coordinate" is not null (not null in S43), the NW configuration display unit 15 extracts each of the coordinate values relating to (1) and (2) below out of the rows of E set in S41 (S44).

(1) x coordinate value defined by value in row of which the attribute name is "x coordinate" (e.g., "10" of row relating to entityName "point Entity_OADM_1", attribute name "x coordinate" shown in FIG. 13A)

(2) y coordinate value defined by value in row of which the attribute name is "y coordinate" (e.g., "50" of row relating to entityName "point Entity_OADM_1", attribute name "y coordinate" shown in FIG. 13A)

The NW configuration display unit 15 generates an image where a point has been drawn at a position corresponding to the coordinates information of E extracted in S44 (S45).

The NW configuration display unit 15 extracts, out of the rows corresponding to X extracted in S42 in the point Entity table stored in the information object DB 14, each of the coordinate values relating to (1) and (2) below (S46).

(1) x coordinate value defined by value in row of which the attribute name is "x coordinate" (e.g., "10" of row relating to entityName "point Entity_IP_1", attribute name "x coordinate" shown in FIG. 14)

(2) y coordinate value defined by value in row of which the attribute name is "y coordinate" (e.g., "80" of row relating to entityName "point Entity_IP_1", attribute name "y coordinate" shown in FIG. 14)

The NW configuration display unit 15 generates an image where a point has been drawn at a position corresponding to the coordinates information extracted in S46 (S47).

The NW configuration display unit 15 generates an image where a line between the coordinate values extracted in S44 and the coordinate values extracted in S46, i.e., a line indicating the correspondence relation between inter-layer point information, has been drawn (S48), and the processing by the NW configuration display unit 15 returns to the top of the Loop process.

When the Loop process ends, the NW configuration display unit 15 displays the image generated so far, and ends the procedures of drawing the connection relation of point information of information objects.

Performing the procedures such as described above enables drawing that is not dependent on protocol type.

Next, drawing of plane information of information objects will be described.

Figure 20:
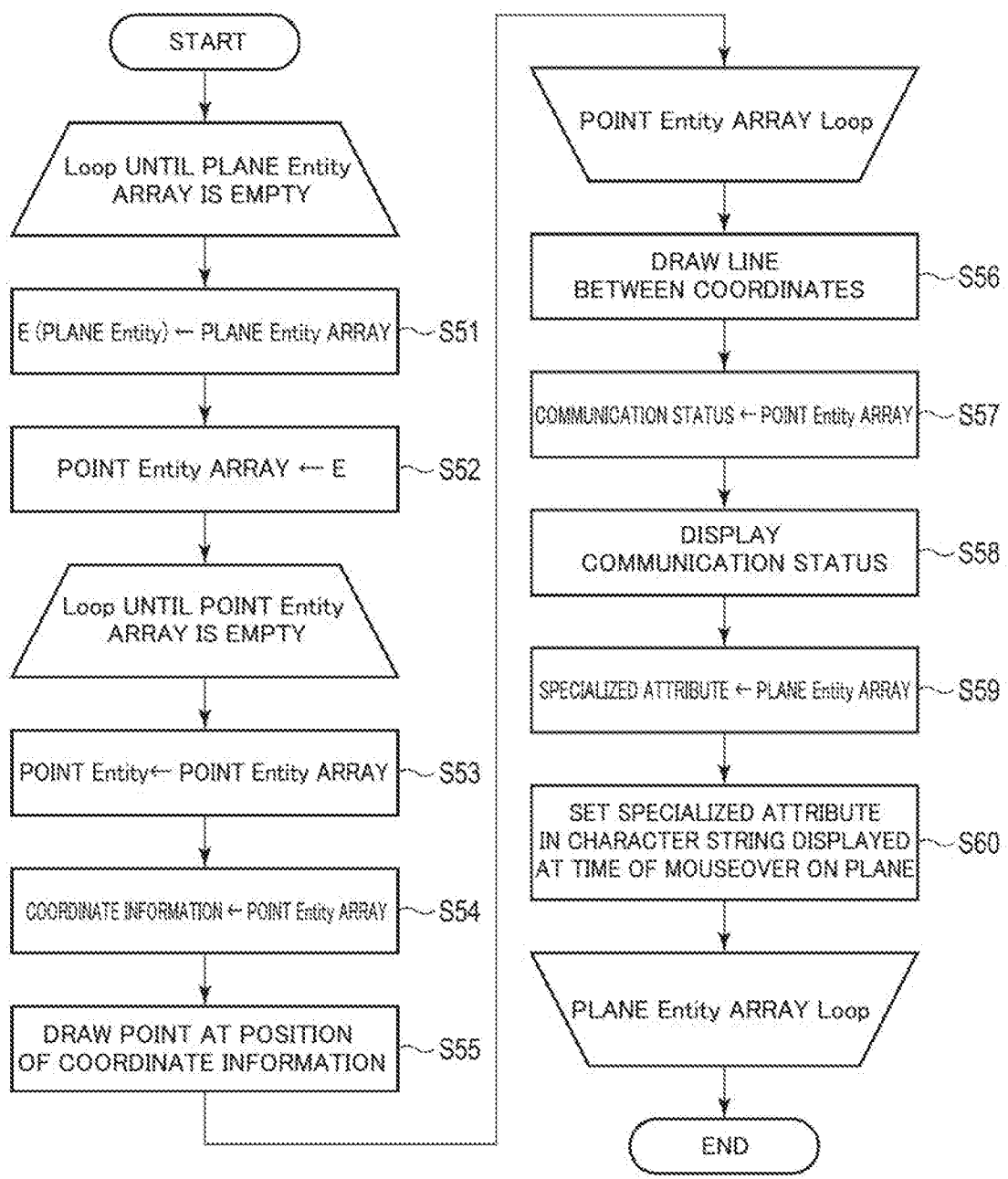
FIG. 20 is a flowchart illustrating an example of procedures of drawing plane information of an information object.

FIG. 20 is a flowchart illustrating an example of procedures of drawing plane information of an information object (Entity).

First, the NW configuration display unit 15 starts a first Loop process that is a Loop processing performed until unselected rows are gone from the rows of the plane Entity table where values have been stored in S25. The NW configuration display unit 15 selects, of the unselected rows of the plane Entity table stored in the information object DB 14, a row where the same entityName (e.g., plane Entity_OADM shown in FIG. 15) is defined, and sets this selected row to be E (plane Entity) that is the object of processing (S51).

The NW configuration display unit 15 acquires a row where the entityName (e.g., "point Entity_OADM_1", "point Entity_OADM_2", "point Entity_OADM_3" shown in FIG. 13A) corresponding to the value of E (plane Entity) set in S31 is defined, from the point Entity table (S52).

The NW configuration display unit 15 starts a second Loop process that is a Loop process performed until unselected rows are gone from the array acquired in S52. The NW configuration display unit 15 selects, out of the rows of the array acquired in S52, a row that is unselected and also where the same entityName (e.g., plane Entity_OADM shown in FIG. 15) is defined, and sets this row as the point Entity to be the object of processing (S53).

The NW configuration display unit 15 extracts each of the coordinate values relating to (1) and (2) below out of this selected row (S54).

(1) x coordinate value defined by value in row of which the attribute name is "x coordinate" (e.g., "10" of row relating to entityName "point Entity_OADM_1", attribute name "x coordinate", "110" of row relating to entityName "point Entity_OADM_2", attribute name "x coordinate", and "50" of row relating to entityName "point Entity_OADM_3", attribute name "x coordinate", shown in FIG. 13A)

(2) y coordinate value defined by value in row of which the attribute name is "y coordinate" (e.g., "50" of row relating to entityName "point Entity_OADM_1", attribute name "y coordinate", "50" of row relating to entityName "point Entity_OADM_2", attribute name "y coordinate", and "45" of row relating to entityName "point Entity_OADM_3", attribute name "y coordinate", shown in FIG. 13A)

The NW configuration display unit 15 generates an image where a point has been drawn at a position corresponding to the coordinates information extracted in S43 (S55), and returns to the top of the second Loop process.

When the second Loop process ends, the NW configuration display unit 15 generates an image where a line has been drawn between the coordinates extracted in S54 in this second Loop process (S56).

The NW configuration display unit 15 extracts, out of the rows acquired in S52, the communication status name (e.g., "established" shown in FIG. 15) that is defined in a row where the attribute name is "communication status" (S57).

The NW configuration display unit 15 generates an image of a plane that reflects the connection status extracted in S57, on the image drawn in S56 (S58).

The NW configuration display unit 15 extracts a specialized attribute name (e.g., ring1) defined by the value of a row of which the attribute name is a specialized attribute (e.g., ring name), out of the rows selected from the plane Entity table in S51 (S59).

The NW configuration display unit 15 sets the specialized attribute extracted in S59 to a character string displayed at the time of mouseover on the plane drawn in S58 (S60), and returns to the top of the first Loop process. When the first Loop process ends, the NW configuration display unit 15 displays the image generated so far, and ends the procedures of drawing plane information of the information object.

Performing the procedures such as described above enables drawing that is not dependent on protocol type.

As described above, in the network management device according to an embodiment of the present invention, NW properties and information objects are defined beforehand, and accordingly NW information is drawn with a highly versatile arrangement that is not dependent on protocol type. Thus, even if a change in NW information occurs in protocol layers due to a change in the type or number of network devices, there is no need to perform corrections regarding display of information objects.

Note that the invention according to the present application is not restricted to the above embodiment, and various modifications can be made at the stage of implementation, without departing from the spirit thereof. Also, embodiments may be appropriately combined as much as possible, and in this case, advantages of combination can be obtained. Further, inventions in various stages are included in the above embodiment, and various inventions can be extracted by appropriate combinations of a plurality of components that are disclosed.

The techniques described in the embodiments can be stored in a recording medium such as, for example, a magnetic disk (floppy (registered trademark) disk, hard disk, etc.), optical disc (CD-ROM, DVD, MO, etc.), semiconductor memory (ROM, RAM, flash memory, etc.) or the like, or transmitted and distributed by a communication medium, as a program (software means) that can be executed by a calculator (computer). Note that the program stored at the medium side includes a setting program that causes the calculator to configure software means (not only an execution program alone but also including tables and data structures) in the calculator to be executed by the calculator. The calculator that realizes the present device reads in the program recorded in a recording medium, or in some cases constructs software means by the setting program, and executes the above-described processing by operations thereof being controlled by the software means. Note that the recording medium as used in the present specification is not restricted to that for distribution, and also includes storage media such as magnetic disks, semiconductor memory, and so forth, provided inside the calculator or to equipment connected via a network.

REFERENCE SIGNS LIST

11 NW properties acquisition unit,
12 Spec DB,
13 Information object acquisition unit,
14 Information object DB,
NW configuration display unit.

The invention claimed is:

1. A network management device, comprising:
network property storage means for storing information representing network properties, wherein the network properties include line information representing a flow of communication over a network, point information representing a terminal point of communication traffic, and plane information representing a range of flow of communication;
information object storage means for storing an information object corresponding to the network properties in the network property storage means, where the information object includes values for the network properties and information common to a plurality of types of communication protocols, and information specialized to types of communication protocols;
a processor; and
a storage medium having computer program instructions stored thereon, when executed by the processor, perform to
acquire, from the network property storage means, information representing network properties corresponding to an optional protocol layer;
acquire, from the information object storage means, the information object corresponding to the network properties; and
display means for displaying the information object, wherein the display means displays the information common to a plurality of types of communication protocols as a shape configured of the line information, the point information, and the plane information, and displays the information specialized to types of communication protocols as a character string corresponding to the shape.

2. The network management device of claim 1 wherein the network property storage means is a first data store and the information representing network properties is common across communication protocols, and the information object storage means is a second data store separate from the first data store and the information object includes values for the network properties specific to a given communication protocol.

3. A network management method carried out by a network management device that has network property storage means for storing information representing network properties and information object storage means for storing an information object corresponding to the network properties in the network property storage means, where the information object includes values for the network properties and information common to a plurality of types of communication protocols, and information specialized to types of communication protocols, the method comprising:
acquiring, from the network property storage means, information representing network properties corresponding to an optional protocol layer, wherein the network properties include line information representing a flow of communication over a network, point information representing a terminal point of communication traffic, and plane information representing a range of flow of communication;
acquiring, from the information object storage means, the information object corresponding to the network properties that have been acquired; and
displaying the information object that has been acquired, wherein the information common to a plurality of types of communication protocols is displayed as a shape configured of the line information, the point information, and the plane information, and wherein the information specialized to types of communication protocols is displayed as a character string corresponding to the shape.

4. A non-transitory computer readable medium including instructions executable by one or more processors to:
acquiring, from a network property storage means, information representing network properties corresponding to an optional protocol layer, wherein the network properties include line information representing a flow of communication over a network, point information representing a terminal point of communication traffic, and plane information representing a range of flow of communication;
acquiring, from a information object storage means, information object corresponding to the network properties in the network property storage means, where the information object includes values for the network properties and information common to a plurality of types of communication protocols, and information specialized to types of communication protocols; and
displaying the information object that has been acquired, wherein the information common to a plurality of types of communication protocols is displayed as a shape configured of the line information, the point information, and the plane information, and wherein the information specialized to types of communication protocols is displayed as a character string corresponding to the shape, where the network property storage means stores information representing network properties and the information object storage means stores an information object relating to the network properties stored in the network property storage means.

* * * * *